United States Patent [19]

Tanimoto

[11] Patent Number: 4,540,927
[45] Date of Patent: Sep. 10, 1985

[54] TWO SPEED STEP MOTOR DRIVING APPARATUS FOR COPYING MACHINES

[75] Inventor: Yasufumi Tanimoto, Fujisawa, Japan

[73] Assignee: Tokyo Shibaura Denki Kabushiki Kaisha, Kawasaki, Japan

[21] Appl. No.: 557,583

[22] Filed: Dec. 2, 1983

[30] Foreign Application Priority Data

Dec. 3, 1982 [JP] Japan .................................. 57-212154

[51] Int. Cl.³ .............................................. G05B 19/40
[52] U.S. Cl. ......................................... 318/696; 355/8
[58] Field of Search ................. 318/11, 162, 163, 164, 318/498, 499, 524, 557, 595, 696; 355/8

[56] References Cited

U.S. PATENT DOCUMENTS

| | | | |
|---|---|---|---|
| 3,746,958 | 7/1973 | Leenhouts | 318/696 |
| 4,153,866 | 5/1979 | Leenhouts | 318/696 |
| 4,221,001 | 9/1980 | Heeren | 318/696 |

FOREIGN PATENT DOCUMENTS 55-100098  7/1980  Japan .................................. 318/696

OTHER PUBLICATIONS

IBM Technical Disclosure Bulletin, vol. 14, No. 8, pp. 2443-2446, Jan. 1972.
Ibid, vol. 15, No. 3, pp. 930-931, Aug. 1972.
Ibid, vol. 16, No. 9, pp. 2859-2862, Feb. 1974.
Ibid, vol. 17, No. 9, pp. 2630-2631, Feb. 1975.

*Primary Examiner*—William M. Shoop
*Assistant Examiner*—Bentsu Ro
*Attorney, Agent, or Firm*—Cushman, Darby & Cushman

[57] ABSTRACT

A pulse motor driving apparatus for the optical unit in a copying machine includes an excitation phase designating circuit for designating phase windings alternately from one phase to two phases and from two phases to one phase at the time of original scanning or forward rotation, and also designating the phase windings in pairs with every two phases at the time of return of the optical unit or reverse rotation. A drive circuit supplies drive pulses successively to the phase windings designated by the excitation phase designating circuit to rotate a pulse motor faster at the time of reverse rotation than at the time of forward rotation.

6 Claims, 8 Drawing Figures

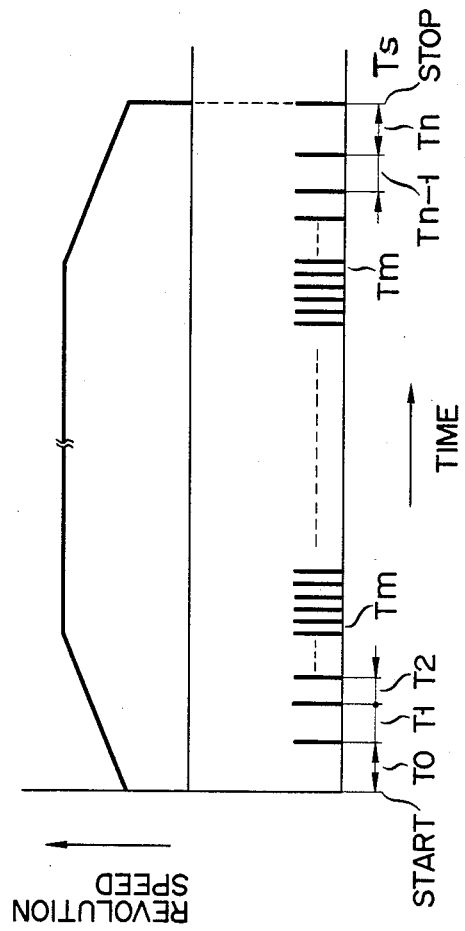

TWO SPEED STEP MOTOR DRIVING APPARATUS FOR COPYING MACHINES

BACKGROUND OF THE INVENTION

The present invention relates to a pulse motor driving apparatus and, more particularly, it relates to a pulse motor driving apparatus for use in copying machines.

With copying machines of the fixed document table type, the optical section including the exposure lamp, mirrors and the like is reciprocated along the fixed document table to optically scan a document on the document table. The windings of a pulse motor are excited alternately from one phase to two phases during the document scanning to rotate the pulse motor, which drives the optical section, at a small pitch so as to enhance image resolving power. Namely, the pulse motor is driven by the one-to-two phase excitation. This one-to-two phase excitation is repeated during return of the optical section so that the time necessary for the optical section to reciprocate along the fixed document table becomes long, that is, the copying time per sheet becomes long.

SUMMARY OF THE INVENTION

The object of the present invention is therefore to provide a pulse motor driving apparatus capable of driving the pulse motor to shorten the reciprocating time of the optical section of the copying machine without decreasing resolution.

According to the present invention, there is provided a pulse motor drive circuit which drives the pulse motor selectively in first or second rotation mode, the rotation speed of the pulse motor being higher in the second rotation mode than the first one. The pulse motor drive circuit changes over the phase windings alternately from one phase to two phases in the first rotation mode and also changes over in pairs with evey two phases in the second rotation mode, responding to phase designating information applied from an exciting phase designation circuit.

BRIEF DESCRIPTION OF THE DRAWINGS

FIG. 4 is a drawing showing a rotation curve of the pulse motor and phase changeover timings.

FIG. 5 is a format of phase changeover timing data under forward rotation mode.

FIG. 6 is a format of phase changeover timing data under reserve rotation mode.

DETAILED DESCRIPTION OF THE PREFERRED EMBODIMENT

Figure 1:
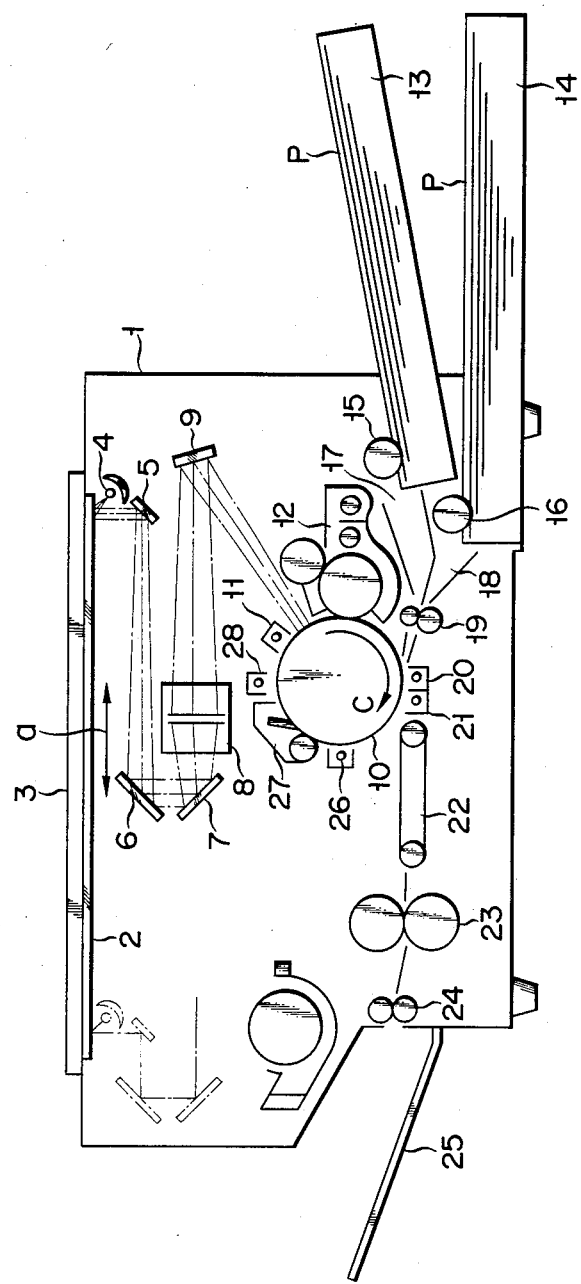
FIG. 1 shows the structure of the copying machine provided with pulse motor driving apparatus according to the present invention.

FIG. 1 roughly shows a copying machine of the fixed document table type provided with a pulse motor driving apparatus according to the present invention.

A document table 2 (or a sheet of transparent glass) for supporting a document is fixed on the upper surface of a cabinet 1 and a document cover 3 is freely swingably arranged on the document table 2. The document or orginal laid on the document table 2 is exposed and scanned by an optical unit when this optical unit moves one way along the underside of the document table 2, the optical unit comprising an exposure lamp 4 and mirrors 5, 6 and 7. The optical unit reciprocates along the underside of the document table as shown by an arrow (a) in FIG. 1.

The mirrors 6 and 7 move in this case at a speed half that of the mirror 5 so as to keep their optical lengths certain. Light reflected by the original when scanned by the optical unit, that is, when light-illuminated by the exposure lamp 4 is reflected by the mirrors 5, 6 and 7, then passes through a copying magnification setting lens block 8, and is further reflected by a mirror 9 to photoconductive drum 10, so that the original is imaged on the surface of the photoconductive drum 10.

The photoconductive drum 10 rotates in a direction shown by an arrow (c) and is charged over its entire surface by a charger 11. The orginal image is then exposed by the optical unit to form an electrostatic latent image, to which toner is applied by a developing unit 12 to make the latent image visible. Sheets of copying paper P are picked up one by one by a feeding roller 15 or 16 from an upper or lower paper supply cassette 13 or 14 and guided through a paper guiding path 17 or 18 to a resist roller pair 19, by which the copying papers are fed to an image transferring section. The copying paper supply cassettes 13 and 14 are freely detachably arranged at the lower right corner of the cabinet 1, and selected by the operator at an operation panel (not shown). The copying paper P fed to the image transferring section is brought into close contact with the surface of the photoconductive drum 10 at the area of a transfer charger 20 and has the toner image transferred from the photoconductive drum 10 by the action of the transfer charger 20. The paper P to which the toner image has been transferred is peeled off from the photoconductive drum 10 by means of a separating charger 21, conveyed on a paper conveyor 22, and fed to a pair of fusing rollers 23 where the toner image transferred is fused on the copying paper P, the paired fusing rollers 23 being arranged at the terminal end of the conveyor 22. The paper P to which the toner image has been fused is discharged by a pair of paper discharging rollers 24 to a tray 25 outside the cabinet 1. After the image-transferring process, the photoconductive drum 10 is discharged by a discharger 26, residual toner on its surface is cleaned by a cleaner 27, and the after-image on its surface is erased by a fluorescent lamp 28. The next copying process is thus made ready.

Figure 2:
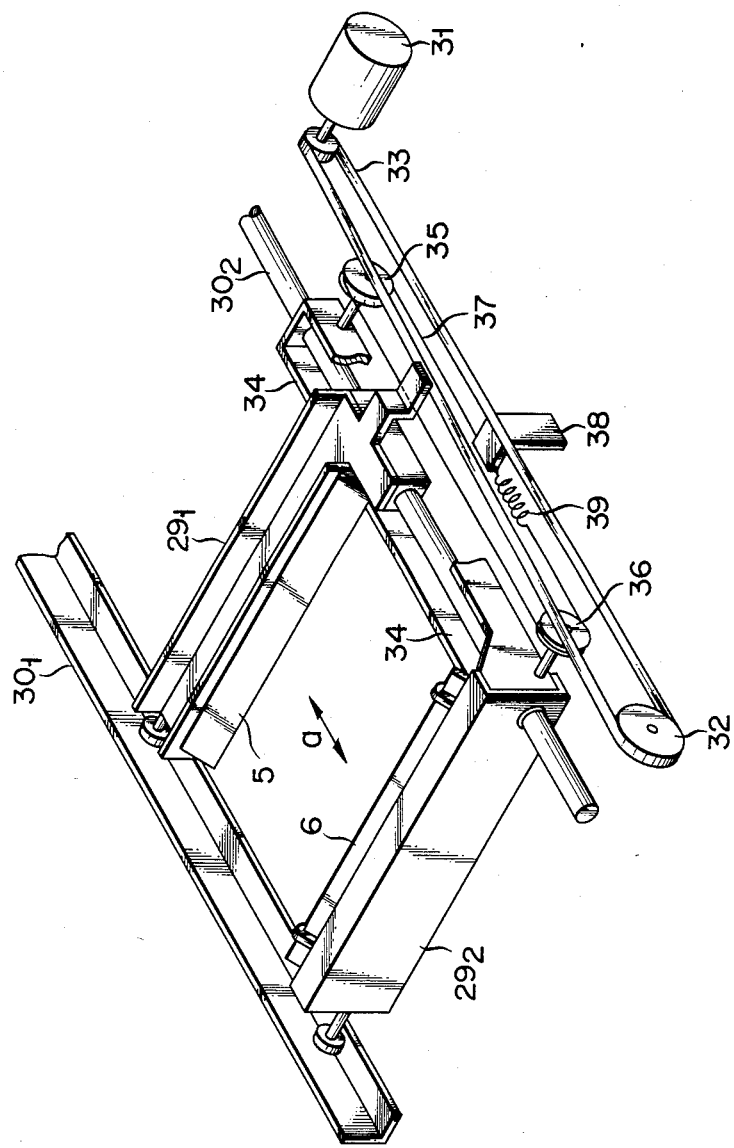
FIG. 2 is a perspective view showing a section for driving the optical system shown in FIG. 1.

FIG. 2 shows a driving mechanism for reciprocating the optical unit. More specifically, the mirror 5 (and the exposure lamp 4) are supported by a first carriage $29_1$ and the mirrors 6 and 7 by a second carriage $29_2$. These carriages $29_1$ and $29_2$ are guided by guide rails $30_1$ and $30_2$ to freely horizontally move in such directions as shown by the arrow (a). A four-phase pulse motor 31 drives a pulley 32. An endless belt 33 is stretched between the motor 31 and the idle pulley 32 and one end of the carriage $29_1$ which supports the mirror 5 is fixed midway on the belt 33. Two pulleys 35 and 36 separated from each other in the axial direction of the rail $30_2$ are freely rotatably attached to a guide 34 for the rail $30_2$ of the second carriage $29_2$ which supports the mirrors 6 and 7, and a wire 37 is stretched between the pulleys 35 and 36. One end of the wire 37 is fixed to a fixed member 38 while the other end thereof is also fixed to the fixed member 38 through a coil spring 39. Midway on the wire 37 is fixed one end of the first carriage $29_1$.

When the pulse motor 31 rotates, the belt 33 is rotated to move the first carriage $29_1$ together with the second carriage $29_2$. Since the pulleys 35 and 36 serve this time as moving pulleys, the second carriage $29_2$ moves at a speed half that of the first carriage $29_1$ and in the same direction as the first carriage $29_1$ moves. The moving direction of the first and second carriages $29_1$ and $29_2$ is switched over by the rotating direction of the pulse motor 31.

Figure 3:
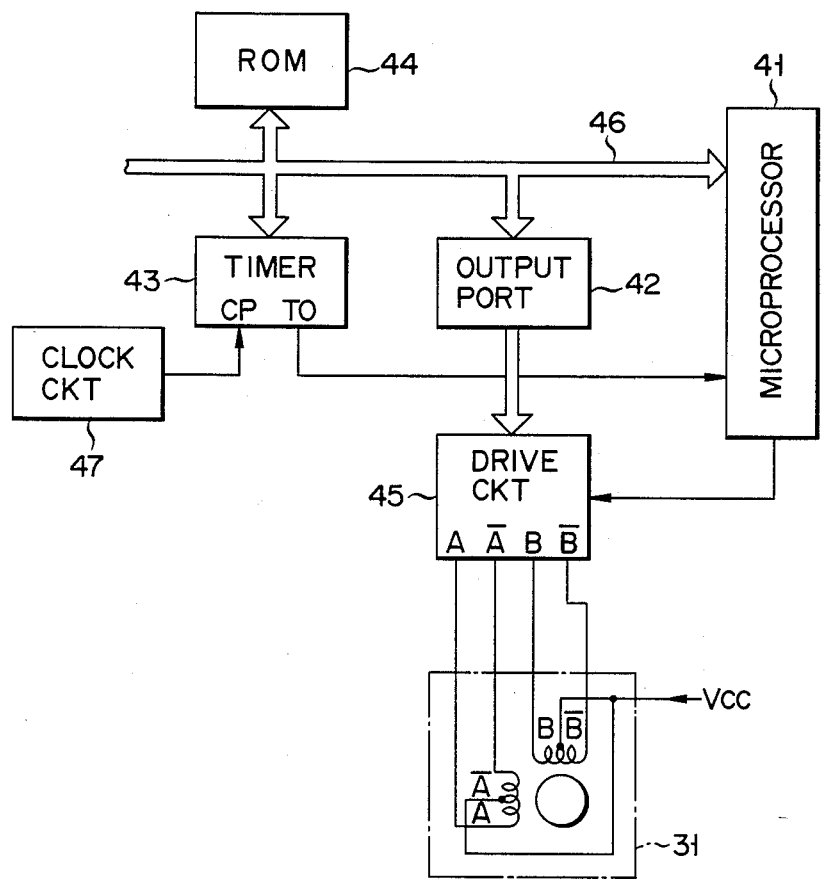
FIG. 3 is a circuit block diagram showing the motor driving apparatus.

According to a circuit block of the pulse motor driving apparatus shown in FIG. 3, a microprocessor 41 which serves as the main control section is connected to an output port 42, a timer 43 and a ROM 44 through a data bus 46. The output port 42 is connected to a drive circuit 45 and outputs or phase output terminals A, $\overline{A}$, B and $\overline{B}$ of the drive circuit 45 are connected to their corresponding windings. To a terminal CP of the timer 43 is connected a clock circuit 47, from which clock pulses each having a pulse width of Tp are supplied. Phase changeover information corresponding to a rotation curve of the pulse motor 31 is stored in the ROM 44. The rotation curve of the pulse motor 31 is shown in FIG. 4, which also shows changeover time intervals corresponding to the rotation curve. According to the rotation curve, rotation speed increases steadily at the rising of motor rotation, and when it reaches a predetermined speed, the motor 31 continues to rotate at the predetermined speed. The rotation speed falls steadily when the motor 31 comes near stopping, and the motor 31 then stops rotating. According to FIG. 4, phase changeover time intervals become shorter and shorter like T0, T1, T2, . . . at the rising of the rotating speed, and the motor 31 continues to rotate at the same speed when the phase changeover time intervals become Tm. The phase changeover time intervals become longer and loger like Tm . . . Tn−1, Tn at the falling rotation, and the motor stops rotating when time reaches Ts. The values (T0/TP, T1/TP . . .) obtained by dividing , respectively, the phase changeover time intervals T0 to Tn by the clock pulse width Tp represent phase changeover timing data, and these phase changeover timing data each corresponding to each of the time intervals T0 to Tn are stored, as D0, D1, D2, . . . , Dn shown in formats of FIGS. 5 and 6, in the ROM 44. FIG. 5 shows, however, phase changeover timing data used in the first rotation mode i.e., forward rotation mode, while FIG. 6 data used in the second rotation mode i.e., reverse rotation mode under which the motor rotates at a higher speed than when it rotates in the forward rotation mode. An exciting system changeover designation data Dx is inserted between data Dn and Dn−1 among all data used in the reverse rotation mode shown in FIG. 6.

Figure 7:
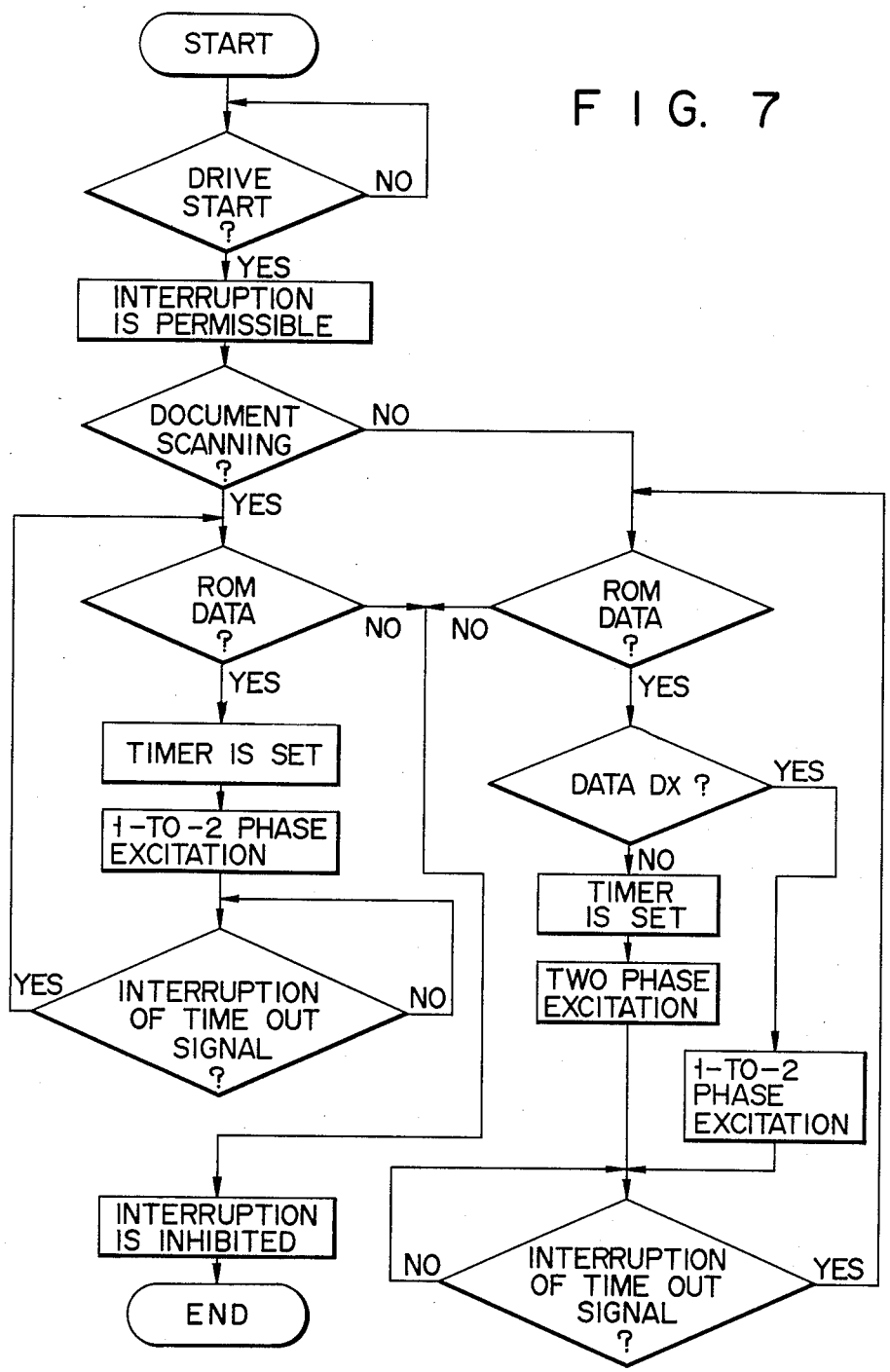
FIG. 7 is a flow chart intended to explain the operation of the circuit shown in FIG. 3.
Figure 8:
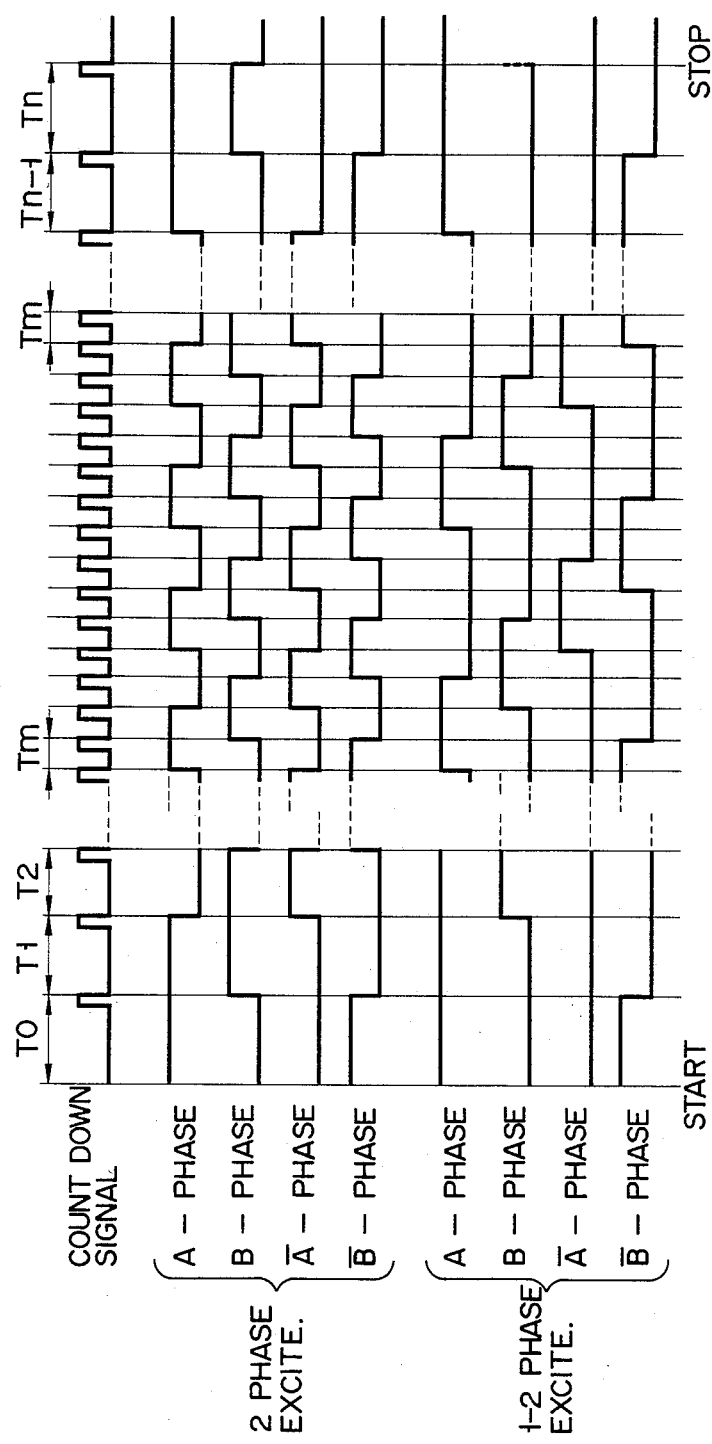
FIG. 8 is time waveforms showing driving pulses applied to the pulse motor.

Circuit operation of the motor driving apparatus shown in FIG. 3 will be decribed referring to flow chart and time waveforms in FIGS. 7 and 8, respectively.

When an optical unit driving command is applied to the microprocessor 41 in response to the operation of a start button, for example, the microprocessor 41 permits an interruption and also detects whether or not it is in document scanning mode. When it is in document scanning mode, the microprocessor 41 reads out the phase changeover timing data D0 for the forward rotation mode from the ROM 44 and sets it in the timer 43. Further, the microprocessor 41 sets in the output port 42 two phases or phases A and $\overline{B}$, for example, corrseponding to the forward rotation mode i.e., one-to-two phase exciting mode. The drive circuit 45 supplies drive pulses to the exciting windings of phases A and B set whereby the pulse motor 31 starts step rotation at 0.9°. The timer 43 is counted down this present time, synchronizing with clock pulses applied from the clock circuit 47. When it is counted down to the value of data D0, the timer 43 supplies a time-out signal, as an interrupting signal, to the microprocessor 41. When the microprocessor 41 detects this time-out signal, it judges that the exciting time of two-phase excitation for the pulse motor has been finished, and sets one exciting phase i.e., only phase A in the output port 42 while reading out the data D1 from the ROM 44 to set it in the timer 43. The drive circuit 45 supplies a drive pulse to the winding of phase A to rotate the pulse motor by another 0.9°. When the timer 43 is counted down only by data D1 and generates another time-out signal, the data D2 in the ROM 44 is set in the timer 43 and one phase excitation is changed over to two-phase excitation to excite the windings of phases A and B. When data are successively read out of the ROM 44 and the pulse motor 31 is positively driven every 0.9° thanks to one-to-two phase excitation, as described above, the optical unit is moved forward. When the optical unit reaches the final point of its forward movement or phase excitation in response to the data Dn is finished, the microprocessor 41 inhibits an interruption and stops the pulse motor 31 temporarily. Namely, excitation of the phase which corresponds to the data Dn is held. Thereafter when another drive start command is again applied to the microprocessor 41, it permits an interruption and sets the reverse rotation mode. Since it is not in document scanning mode this time, data D0 (FIG. 6) for the reverse rotation mode is read out of the ROM 44 and set in the timer 43. Since the reverse rotation mode is of two-phase excitation, two phases or phases A and $\overline{B}$, for example, are set in the output port 42. Therefore, drive pulses are applied to the windings of phases A and B for the pulse motor 31, and the pulse motor 31 is reversely rotated by 1.8° to return the optical unit. When the timer 43 is counted down to the data D0 and becomes zero, synchronizing with clock pulses, next data D1 for reverse rotation is read out of the ROM 44 and set in the timer 43. Two phases or phases A and B are set in the output port 42 and the drive circuit 45 suppiles drive pulses to the windings of phases A and B. Namely, the pulse motor 31 is again two-phase-excited to rotate by another 1.8°. The pulse motor 31 is reversely rotated every 1.8° whenever reverse rotation mode data D0, D1, . . . are successively read out as described above. When the data Dx is read out, the microprocessor 41 sets one phase or phase B designating signal, for example, in the output port 42. Thereafter, the data Dn is set in the timer 43 and the drive circuit 45 supplies the drive pulse only to the winding of phase A to stop the pulse motor 31. Return of the optical unit is thus finished, keeping the optical unit ready for a next copying process. The microprocessor 41 permits an interruption and the operation flow is ended.

As described above , the phase windings of the pulse motor are in one-to-two phase excitation mode at the time of original scanning and changed over from one phase to two phases and from two phases to one phase like A→AB→B→B$\overline{A}$→$\overline{A}$→$\overline{AB}$→$\overline{B}$→$\overline{B}$A→A, thus causing the pulse motor to be step-rotated every 0.9°, while the phase windings are in two-phase excitation mode at the time of returning and changed over every two-phase unit like A→$\overline{AB}$→$\overline{BA}$→$AB$→$BA$→, thus causing the pulse motor to be step-rotated every 1.8° which is faster than at the time of orginal scanning. Therefore, the document can be scanned with high resolution at the time of document scanning and high speed return of the optical unit is also made possible, so that copying speed can be enhanced without lowering the resolution. In addition, phase changeover cycles are the same under any of the one-to-two phase excitation modes and the two-phase excitation modes, and it is therefore unnecessary to substantially change programs for the microprocessor in both modes. Namely, interrupting cycles may be the same. Further, when the pulse motor which is driven in the two-phase excitation mode at the time of returning is stopped, phase excitation is changed over to one phase excitation, thus preventing the rotor from being drawn to the stronger exciting power winding of phase A or B to make the stop position of the motor unstable as often seen in the case of the two-phase excitation.

Although the present invention has been described referring to the case where the pulse motor driving apparatus is applied to a copying machine to drive the optical unit, it should be understood that the present invention may be applied to drive the optical unit employed in a facsimile, electronic printer and the like. In short, the present invention may be applied to drive any optical unit which reciprocates relative to the document.

What is claimed is:

1. An apparatus for driving a pulse motor provided with a plurality of windings, said pulse motor being used for scanning in a copying machine, said apparatus comprising:

excitation phase designating means for selectively setting a document scanning mode and a return mode designating the phase windings alternately from one phase to two phases and from two phases to one phase in the document scanning mode, and successively designating the phase windings in pairs with every two phases in the return mode, the pulse motor being rotated faster in the return mode than the document scanning mode; and drive circuit means for supplying a drive pulse and drive pulses alternately to the one phase winding and two phase windings designated by the excitation phase designating means in the document scanning mode, and supplying drive pulses to the two phase windings designating by the excitation phase designating means in the return mode.

2. A pulse motor driving apparatus according to claim 1, wherein the excitation phase designating means comprises means for setting a stop mode after the return mode, and designating only one phase winding in the stop mode.

3. A pulse motor driving apparatus according to claim 1, wherein the excitation phase designating means has means for storing phase changeover timing data and timer means for generating a phase changeover signal at an excitation time set in response to the phase changeover timing data applied from the storing means.

4. A pulse motor driving apparatus according to claim 3, wherein the storing means stores the phase changeover timing data which change phase changeover timings successively.

5. A pulse motor driving apparatus according to claim 3, wherein, responsive to clock pulses, the timer means counts down the excitation time set by the timing data, and generates the phase changeover signal when the count of said timer means becomes zero.

6. A pulse motor driving apparatus according to claim 1, wherein the pulse motor is to drive the optical unit in the copying machine.

* * * * *